(12) United States Patent
Jacoby et al.

(10) Patent No.: US 12,128,316 B2
(45) Date of Patent: Oct. 29, 2024

(54) PLAYABILITY SERVICE APPLICATION PROGRAMMING INTERFACE

(71) Applicant: Google LLC, Mountain View, CA (US)

(72) Inventors: Mackenzie Lee Jacoby, Pyrmont (AU); Andrew David Foster, Naremburn (AU)

(73) Assignee: GOOGLE LLC, Mountain View, CA (US)

( * ) Notice: Subject to any disclaimer, the term of this patent is extended or adjusted under 35 U.S.C. 154(b) by 183 days.

(21) Appl. No.: 16/487,654

(22) PCT Filed: Nov. 17, 2017

(86) PCT No.: PCT/US2017/062183
§ 371 (c)(1),
(2) Date: Aug. 21, 2019

(87) PCT Pub. No.: WO2018/164739
PCT Pub. Date: Sep. 13, 2018

(65) Prior Publication Data
US 2020/0061472 A1     Feb. 27, 2020

Related U.S. Application Data

(60) Provisional application No. 62/468,706, filed on Mar. 8, 2017.

(51) Int. Cl.
*A63F 13/216* (2014.01)
*A63F 13/79* (2014.01)
(Continued)

(52) U.S. Cl.
CPC ............ *A63F 13/79* (2014.09); *A63F 13/216* (2014.09); *G06F 9/543* (2013.01); *G06F 16/29* (2019.01); *G06F 16/9537* (2019.01)

(58) Field of Classification Search
CPC ...... G06F 16/29; G06F 16/9537; G06F 9/543; A63F 13/79; A63F 13/216
See application file for complete search history.

(56) References Cited

U.S. PATENT DOCUMENTS

| 9,234,763 B1 | 1/2016 | Savvopoulos et al. |
| 2009/0119255 A1 | 5/2009 | Frank et al. |

(Continued)

FOREIGN PATENT DOCUMENTS

| CN | 103002960 | 3/2013 |
| CN | 104735614 | 6/2015 |

(Continued)

OTHER PUBLICATIONS

International Search Report and Written Opinion for PCT/US2017/062183, mailed on Feb. 7, 2018, 12 pages.

(Continued)

*Primary Examiner* — Andrea C Leggett
(74) *Attorney, Agent, or Firm* — DORITY & MANNING P.A.

(57) ABSTRACT

The present disclosure provides systems and methods for providing geographic information for software application development. In one example, a computer-implemented method is provided for determining candidate locations for a playability service, which includes obtaining, by one or more computing devices, a plurality of location points and filtering the plurality of location points to obtain a plurality of candidate location points based at least in part on a suitability of each of the location points for use in generating location-based application content. The method further includes generating, by the one or more computing devices, a candidate location dataset based on the plurality of candidate location points. The method further includes receiving, by the one or more computing devices, a request for one or more of the plurality of candidate location points and (Continued)

| Candidate Game Locations | | | | |
|---|---|---|---|---|
| Region A | | | | |
| Latitude | Longitude | Identifier | Score | Type |
| 33.3333333 | -111.1111111 | aaaaaaaaaaaa | 0.83316296 | park |
| 34.4444444 | -117.7777777 | pppppppppppp | 0.8330737 | park |
| 41.1111111 | -113.3333333 | nnnnnnnnnnnn | 0.8330725 | park |
| 41.8888888 | 15.5555555 | dddddddddddd | 0.83326967 | park |
| 35.5555555 | -115.5555555 | bbbbbbbbbbbb | 0.8320574 | tourist attraction |
| 35.8888888 | -118.8888888 | oooooooooooo | 0.831791 | point of interest |
| 45.5555555 | 14.4444444 | eeeeeeeeeeee | 0.8303478 | park |
| 49.9999999 | -113.7777777 | cccccccccccc | 0.8297493 | park |
| -35.5555555 | 155.5555555 | gggggggggggg | 0.7601646 | zoo | providing data associated with one or more of the plurality of candidate location points in response to the request.

19 Claims, 6 Drawing Sheets

(51) Int. Cl.
  *G06F 9/54* (2006.01)
  *G06F 16/29* (2019.01)
  *G06F 16/9537* (2019.01)

(56) References Cited

U.S. PATENT DOCUMENTS

| | | | | |
|---|---|---|---|---|
| 2012/0290987 | A1* | 11/2012 | Gupta | G06F 30/13 715/848 |
| 2013/0225282 | A1* | 8/2013 | Williams | A63F 13/216 463/29 |
| 2013/0260846 | A1 | 10/2013 | Kruglick | |
| 2014/0200034 | A1* | 7/2014 | Lee | H04W 64/00 455/456.3 |
| 2014/0244163 | A1* | 8/2014 | Zhao | H04W 64/00 701/445 |
| 2015/0153934 | A1 | 6/2015 | Zherebtsov et al. | |
| 2015/0177904 | A1* | 6/2015 | Makuch | G06F 3/0418 345/178 |
| 2016/0180602 | A1* | 6/2016 | Fuchs | G06F 3/012 463/31 |
| 2016/0191637 | A1* | 6/2016 | Memon | G01C 21/362 701/522 |
| 2017/0059347 | A1 | 3/2017 | Flier et al. | |
| 2017/0124562 | A1* | 5/2017 | Hessler | G06Q 20/386 |
| 2018/0374267 | A1* | 12/2018 | Yurkin | G06K 19/06103 |

FOREIGN PATENT DOCUMENTS

| | | |
|---|---|---|
| CN | 104884140 | 9/2015 |
| CN | 105723242 | 6/2016 |

OTHER PUBLICATIONS

Machine Translated Chinese Search Report Corresponding to Application No. 201780088090.6 on Nov. 22, 2022.

* cited by examiner

Candidate Game Locations

Region A

| Latitude | Longitude | Identifier | Score | Type |
|---|---|---|---|---|
| 33.3333333 | -111.1111111 | aaaaaaaaaaaa | 0.83316296 | park |
| 34.4444444 | -117.7777777 | pppppppppppp | 0.8330737 | park |
| 41.1111111 | -113.3333333 | nnnnnnnnnnnn | 0.8330725 | park |
| 41.8888888 | 15.5555555 | dddddddddddd | 0.83326967 | park |
| 35.5555555 | -115.5555555 | bbbbbbbbbbbb | 0.8320574 | tourist attraction |
| 35.8888888 | -118.8888888 | oooooooooooo | 0.831791 | point of interest |
| 45.5555555 | 14.4444444 | eeeeeeeeeeee | 0.8303478 | park |
| 49.9999999 | -113.7777777 | cccccccccccc | 0.8297493 | park |
| -35.5555555 | 155.5555555 | gggggggggggg | 0.7601646 | zoo |

FIG.3

PLAYABILITY SERVICE APPLICATION PROGRAMMING INTERFACE

PRIORITY CLAIM

This application is based upon and claims the right of priority under 35 U.S.C. § 371 to International Application No. PCT/US2017/062183, filed on Nov. 17, 2017, which claims the benefit of priority of U.S. Provisional Application Ser. No. 62/468,706, titled "Geographic Data Application Programming Interface," filed on Mar. 8, 2017. Applicant claims priority to and the benefit of each of such applications and incorporates all such applications herein by reference in their entirety.

FIELD

The present disclosure relates generally to application programming interfaces for providing geographic information to third-party developers.

BACKGROUND

Applications implemented on computing devices, such as mobile computing devices (e.g., smartphones, tablets, smart watches, etc.) have been developed for a variety of purposes, including business, social, health, and other purposes. These applications can provide a user interface (e.g., a graphical user interface) for presenting information to a user as well as allowing the user to interact with the application. Popular applications for mobile computing devices include applications that make varied geographic information available to users.

Application programming interfaces can allow applications implemented on computing devices to interact with various services to provide information and functionality to a user. Application programming interfaces can provide a tool for developers to easily embed information, programming, services, frameworks, and structures into applications for access by the user. For example, a service provider can provide a geographic data application programming interface that can be used to provide third party developers a variety of map data and signals for use in an application developed by the third party.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for determining candidate locations for a playability service. The method can include obtaining, by one or more computing devices, a plurality of location points. The method can further include filtering, by the one or more computing devices, the plurality of location points to obtain a plurality of candidate location points based at least in part on a suitability of each of the location points for use in generating location-based application content. The method can further include generating, by the one or more computing devices, a candidate location dataset based on the plurality of candidate location points. The method can further include receiving, by the one or more computing devices, a request for one or more of the plurality of candidate location points. The method can further include providing, by the one or more computing devices, data associated with one or more of the plurality of candidate location points in response to the request.

Another example aspect of the present disclosure is directed to a computing device. The computing device includes one or more processors and one or more non-transitory computer-readable media that store instructions. The instructions, when executed by the one or more processors, cause the computing device to cause the computing device to perform operations. The operations include obtaining a plurality of location points. The operations further include filtering the plurality of location points to obtain a plurality of candidate location points based at least in part on a suitability of each of the location points for use in generating location-based application content. The operations further include generating a candidate location dataset based on the plurality of candidate location points. The operations further include receiving a request for one or more of the plurality of candidate location points. The operations further include providing data associated with one or more of the plurality of candidate location points in response to the request.

Another example aspect of the present disclosure is directed to one or more non-transitory computer-readable media that store instructions that, when executed by one or more processors of a computing system, cause the computing system to perform operations. The operations include obtaining a plurality of location points. The operations further include filtering the plurality of location points to obtain a plurality of candidate location points based at least in part on a suitability of each of the location points for use in generating location-based application content. The operations further include generating a candidate location dataset based on the plurality of candidate location points. The operations further include receiving a request for one or more of the plurality of candidate location points. The operations further include providing data associated with one or more of the plurality of candidate location points in response to the request.

Other example aspects of the present disclosure are directed to systems, apparatus, tangible, non-transitory computer-readable media, user interfaces, memory devices, and electronic devices associated with an application programming interface for providing geographic information, for instance, to developers of location based-gaming applications.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 3 depicts a block diagram of an example data structure for game location data according to example embodiments of the present disclosure;

DETAILED DESCRIPTION

Figure 1:
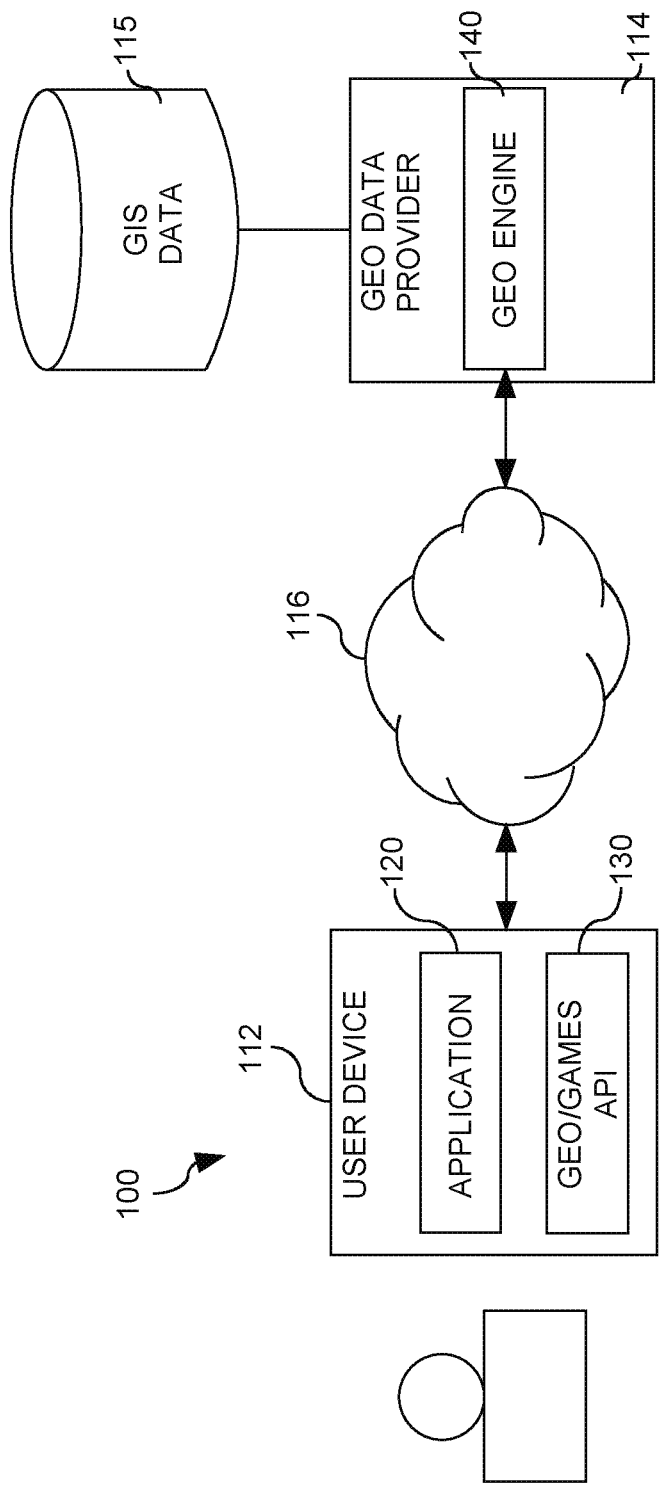
FIG. 1 depicts an overview of an example system for implementing a geographic information service as part of a software application using an application programming interface according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to application programming interfaces ("APIs") for providing geographic information in third party software applications implemented on one or more computing devices, such as web-based software applications implemented in a browser, locally-stored software applications, and other applications. In some embodiments, the API can allow application developers to query and/or populate geographic information provided by a geographic data provider or other source in their software application. The API can allow the developer to easily customize and tailor the experience to accommodate varying platforms and end use cases, such as location-based gaming applications. While some of the embodiments and examples described herein are related to location-based gaming applications, the embodiments are not limited to such. Embodiments may be applicable to a variety of mobile services outside of gaming and used in the development of safe, social, and immersive mobile applications.

More specifically, the API, when invoked by a software application implemented on a computing device, can be configured to request and receive geographic information from a data provider via a communication interface (e.g., over a network, such as the Internet). The API can be configured to present geographic information (e.g., through a graphical user interface component or through audio and/or vibratory cues) to provide a geographic information service embedded in the software application. A geographic information service can be an application (e.g., a software application) that provides geographic information (e.g., location identifiers, location scores, location suggestions, traffic patterns, usage patterns, map geometry, map metadata, real-time signals, location updates, location datasets, etc.) that can be used to generate intelligent and relevant suggestions for use in spawning objects, content, and activities and/or styling an environment in third party applications, such as location-based gaming applications.

In some embodiments, the API may provide a playability service to application developers for use in creating a location aware application, such as a location-based gaming application. For example, developers may need to make decisions regarding the locations to spawn objects, content, and/or activities within a game environment that are associated with real world locations. Such real world locations need to be safe, appropriate, and accessible for players, as well as ideal and fun for gameplay (e.g., not incentivizing users to enter restricted areas). The API may provide a link to a central repository of geographic information maintained by a geographic data provider which may be used to develop location datasets indicative of safe, suitable, and/or ideal locations for a developer to spawn objects and activities within a game environment. In some embodiments, the API may also provide access to base map information (e.g., map geometry, map and/or location metadata, etc.) which a developer may use to generate the application environment, such as a game world within the application.

In some embodiments, the API may provide a playability service to developers whereby the developer may query the geographic data provider for a dataset of location suggestions for use within the developer's application. In some embodiments, the playability service may be a provided as a separate service from a base layer map service provided by the geographic data provider. In some embodiments, the playability service may allow a developer to query specific locations (e.g., by latitude and longitude, location descriptor, or the like) and receive a location score, such as a confidence score, generated by the playability service. The generation of the location score by the playability service may involve a using a variety of signals and data types generated and/or stored by the geographic data provider or may use a small subset of data types generated/stored by the geographic data provider. For example, a developer may determine that a game object should be spawned every five square miles unless the location has a location score falling below a desired level (e.g., the location is not a safe, culturally appropriate, and/or legal location for game play and thus is assigned a lower location score).

According to an example aspect of the present disclosure, in some embodiments, a playability service may provide for generating a list or dataset of candidate locations for a region or area. A playability service can provide candidate location data for one or more candidate locations in a candidate location dataset for a developer to use within an application, such as for placing in-game objects within a location-based gaming application. In some implementations, a playability service can provide for generating the candidate locations in multiple manners. For example, in some embodiments, a playability service can provide for generating candidate location data based on defined locations associated with a map of a region or area, such as points of interest associated with a region of a map. Additionally or alternatively, a playability service can provide for generating candidate location data randomly for a region, for example, to ensure that there is a reasonable density of candidate locations in a region to allow for effective placement of in-game objects within the region.

In some embodiments, the playability service can receive requests from developers (e.g., via an API call) for one or more candidate locations for use in generating location-based application content, such as for placement of in-game objects in a location-based gaming application, for example. In response to the request, the playability service can provide data associated with one or more candidate locations from a candidate location dataset based on parameters and/or constraints provided in the developer request.

In some embodiments, the playability service may provide the candidate location data as scored and/or ranked data where the score and/or rank can be used by a developer, for example, in selecting one or more locations from the candidate locations for a region for generating application content, such as for the placement of in-game objects. In some embodiments, the score for a candidate location point can represent a suitability measure of a location point for use in generating location-based application content. For example, in some embodiments, such as where candidate location data is generated based on point of interest data associated with a region of a map, the candidate locations can be scored and/or ranked based in part on one or more parameters and/or measures associated with the point of interest. For instance, points of interest may be scored based on parameters and/or measures such as popularity (e.g., including a number of visits to location/point of interest, number of search queries directed to the point of interest), prominence (e.g., how well known the point of interest is, number of photos captured of location/point of interest, etc.), landmarkiness (e.g., one or more signals used to determine locations/points of interest for display on a map), basemap rank (e.g., one or more signals used to prioritize locations/points of interest for display on a map), approachability, point of interest category, operating hours, and/or the like.

Additionally, in some embodiments, candidate location ranks may be adjusted based on developer feedback. For example, a candidate location rank can be adjusted by a bonus amount or a penalty amount based on developer feedback on the category of the point of interest. Additionally or alternatively, in some embodiments, such as where candidate location data is generated randomly for a region, the candidate locations can be ranked based on randomly generated scores.

In some embodiments, the playability service may provide for filtering the candidate location data to remove inappropriate locations (e.g., the location is not a safe, culturally appropriate, and/or legal location for game play) from the candidate location data. For example, where candidate location data is generated based on point of interest data associated with a region, the geographic data provider can maintain a blacklist of inappropriate points of interest (e.g., point of interest categories that are not appropriate for game play). For instance, in some embodiments, a location blacklist may be generated based on certain category parameters such as sensitive and/or age restricted points of interest.

Additionally or alternatively in some embodiments, such as where candidate location data is generated randomly for a region, the candidate location data can be generated based on a combined whitelist/blacklist approach. For example, a location whitelist can comprise locations associated with roads that have pedestrian access and no pedestrian restrictions. A location whitelist can also comprise locations associated with parks, gardens, and/or woods within a region. A location blacklist can comprise locations associated with dangerous geographic features (e.g., cliffs) and sensitive locations (e.g., cemeteries, sacred sites, etc.). A location blacklist can also comprise locations that would be associated with restricted point of interest categories, such as sensitive and/or age restricted categories. In some embodiments, to randomly generate candidate location data, the location whitelist can be filtered using the location blacklist (e.g., subtracting the blacklist locations from the whitelist locations) with the candidate location data being generated from the remaining whitelist locations.

The candidate location data can include a plurality of data fields describing the candidate location points. For example, in some embodiments, the candidate location data can include a location of the point (e.g., a latitude and longitude of the candidate location), a place identifier, a score, and a location type.

In some embodiments, the latitude and longitude can represent the candidate location snapped to a nearby road or other suitable location. For example, a point of interest location often represents the center of the point of interest, but it may be more desirable (e.g., for game play) to return the closest location for the point of interest along a nearby road (e.g., the front of a store, restaurant, building, etc. along the road) or traversable path, such as a sidewalk. In some cases, a point of interest may have an associated access point along a road which can be used for the latitude and longitude of the candidate location. In some embodiments, the point of interest location can be snapped to the closest road (e.g., road within a certain distance of the point of interest) or to a road associated with the point of interest (e.g., the point of interest street address). This snapped point of interest location can then be used for the latitude and longitude of the candidate location, rather than the center of the point of interest location.

In some embodiments, the place identifier can be used to obtain additional information about the candidate location, for example, information associated with the point of interest. In some embodiments, the score can represent the quality or desirability of the candidate location, for example, for use in placing in-game objects, and can be used to generate a rank order for the candidate location data, as discussed herein. In some embodiments, the type can identify the category of a point of interest (e.g., park, attraction, store, transit station, etc.). In some embodiments, where the candidate location is a randomly generated location that is not associated with a point of interest, the type may be unset or may be a null value.

The playability service can provide access to the candidate location data to a developer for use in generating locations in an application such as, for example, to provide for placement of in-game objects in a location-based gaming application. For instance, in some implementations, a developer can query the candidate location data to select a certain number of locations from the candidate location for each subdivision of a region (e.g., within each block, within a square mile, etc.). For instance, in some embodiments, a developer may select game locations from the candidate location data based on the candidate location score, the candidate location type, and/or the like. In some embodiments, the geographic data provider may generate one or more candidate location datasets for a developer and may make different candidate location datasets available to different developers and/or for different applications.

For instance, in some embodiments, a developer may be able to tune the candidate locations received via the API based on one or more signals or other data provided from the developer. For instance, the developer can specify that the game is a social game. In that regard, the playability service can serve candidate locations via the API that are more suitable for a social game. More particularly, criteria and/or scores used to rank or prioritize the API can be selected based on the data provided from the developer.

In some embodiments, the candidate locations provided to the developer via the API can be selected based at least in part on data associated with application type or application state from the developer so that the developer can tune the candidate locations received via the API. Application state can refer to, for instance, a state of game play in the location based game. Depending on the state of game play and/or circumstances of the game, different candidate locations can be served via the API. Application type can refer to the type of location based application (e.g., style of game, etc.) using the candidate locations. Depending on the application type, different candidate locations can be served via the API.

In some embodiments, the playability service may provide different masks or map layers indicating the desirability of locations for use in game play. For example, the playability service may analyze locations and determine whether a location is suitable for game play (e.g., a good location), not suitable for game play (e.g., a bad location), or neutral (e.g., undetermined). The playability service may allow a developer to query a certain area and then provide these different location datasets for the requested area.

In some embodiments, the playability service may also consider a variety of factors in determining location scores or layer assignments, such as pedestrian safety, time of day, time of year, weather patterns, events, traffic patterns, and the like.

In some embodiments, the playability service provide flexibility in the location scoring or layer assignment by incorporating third party input, such as feedback from developers and users. Additionally, the playability service may allow for quickly incorporating updated information in the location scoring or layer assignment, for example, indicating locations that are undesirable (e.g., blacklisted) as soon as discovered.

In some embodiments, an API can provide a playable locations service (e.g., playable locations API) which may be associated with a playability service. The playable locations service can provide for design-time building of a game world in a location-based gaming application. The playable locations service can also provide for placement of runtime game objects based on a player's location. In some embodiments, the playable locations service may provide for requesting playable locations in a region of interest and/or requesting updated playable location data periodically.

In some embodiments, a location-based gaming application may be associated with a game server which can augment playable location data with game-specific state data. In such embodiments, the game server can call the playable locations service (e.g., via an API call) to request a list of playable locations in a region and/or request updated playable location data. In some embodiments, an application client (e.g., game client) can call the playable locations service (e.g., via an API call) to request a list of playable locations in a region or request updated playable location data.

In some embodiments, the playable locations service can provide for responding to requests for playable locations in a region of interest based on one or more filter criteria received from an application (e.g., via an API call). For example, the playable locations service can receive a request from an application, such as a location-based gaming application, for playable locations specifying a region if interest for the playable locations (e.g., region where location-based content is to be generated).

In some embodiments, the region of interest may be defined using one or more representations. For example, in some embodiments, the region of interest may be represented as a point and radius, where playable locations can be provided that are within a given radius of the latitude and longitude of a point (e.g., a player's location, etc.). In some embodiments, the region of interest may be represented as a bounding box, defined by a first latitude and longitude and a second latitude and longitude, where the bounding box can provide for retrieving playable locations that are within some viewport. In some embodiments, the region of interest may be represented by defined cells, where the cells are a predefined manner for dividing the world into non-overlapping regions.

In some embodiments, the playable locations service can provide for including one or more filter criteria in a request for playable locations in a region of interest. For example, the filter criteria may specify a maximum number of playable locations to be returned for a region of interest, where the playable locations service will try to find up to the maximum number of locations in the desired region. In some embodiments, a default maximum may be used if a maximum locations parameter is not included in a request, such as returning up to 100 playable locations, for example.

In some embodiments, the filter criteria may specify a ranking method to be used in selecting playable locations. For example, the ranking method may indicate that the highest ranking locations within the region of interest should be returned. Alternatively, the ranking method may indicate that randomly selected locations within the region of interest should be returned, for example, to achieve more diversity in playable locations.

In some embodiments, the filter criteria may specify a minimum and/or maximum location prominence for playable location to be returned. For example, in some embodiments, a minimum location prominence parameter can be specified as one of a set of prominence tiers, such as a default tier (e.g., non-points of interest including generated locations); a first tier (e.g., lowest 90% of points of interest, unfrequented businesses, etc.); a second tier (e.g., top 10% of points of interest, locally known landmarks, etc.); a third tier (e.g., top 1% of points of interest, well known locations, etc.); and a fourth tier (e.g., top 0.05% of points of interest, most popular and recognizable landmarks, etc.). In some embodiments, a ranking method parameter and a prominence parameter can be combined, such as to return the top ranked playable locations within a particular tier.

In some embodiments, the filter criteria may specify point of interest place types for playable locations to be included and/or excluded. For example, a include types parameter can specify particular place types to be returned in the playable locations, such as where a developer wishes to place certain kinds of objects at specific types of places. An exclude types parameter can specify particular types of place types to be excluded from the returned playable locations, such as where developers want to avoid placing objects as specific types of places that may be inappropriate for a particular game.

In some embodiments, the playable locations service can respond to the request for playable locations with a list of the playable locations in the region of interest selected based on any included filter criteria. For example, in some embodiments, the playable locations service can return a list of playable locations including data associated with each of the playable locations. In some embodiments, the data associated with a playable location can include one or more of a unique identifier for the location, a place type for the location, a prominence of the location, a score for the location, a center point of the location, a computed snapped to road point for the location, an access point for the location (if applicable), a timestamp for when the location metadata was last modified, and/or the like.

In some embodiments, the playable locations service may not return exactly the same list of playable locations for successive identical requests. If a set of playable locations is to be static for any period of time, the location identifiers can be stored and used to request updated playable location data for the identified playable locations. For example, in some embodiments, a game server can be used to maintain a set of playable locations for a particular game and the API client on the game server can store at least the location identifiers for the set of playable locations to allow for refreshing the location metadata periodically.

In some embodiments, the playable locations service can provide for responding to request to periodically refresh the location data for specific locations (e.g., using the specific location identifiers) if a location is persisted within an application. For example, the playable locations service can receive a request from an application, such as a location-based gaming application, to refresh the location metadata for one or more playable locations identified by specific location identifiers. In some embodiments, the request to refresh playable location metadata can include the location identifiers of the playable locations to be refreshed as well as a last modified since timestamp parameter to exclude playable location where the metadata has not been modified since the specified timestamp.

In some embodiments, the playable locations service can respond to the request refresh playable location metadata with a list of the specified playable locations and the associated location metadata. In some embodiments, the location metadata included in the response can include a unique identifier for the location, a place type for the location, a prominence of the location, a score for the location, a center point of the location, a computed snapped to road point for the location, an access point for the location (if applicable), a timestamp for when the location metadata was last modified, and/or the like.

The location metadata can also include a location status (e.g., active, temporarily inactive (such as where a location is unreachable due to current conditions such as construction or a special event), removed). If the location status is "removed" or "temporarily inactive," the location metadata can include a status reason, such as inaccessible (e.g., unsuitable due to being unsafe, unreachable, not open to the public, etc.), obsolete (e.g., entity at the location has permanently closed, etc.), replaced (e.g., the location has been merged into another location, etc.), and/or the like. If the location status is "removed" and the status reason is "replaced," the location metadata cans include a location identifier for the new location that replaces the removed location. In some embodiments, for removed locations, the location metadata will reflect the last state before the location was removed.

In some embodiments, the API may provide a geo query service to application developers for use in creating a location aware application, such as a location-based gaming application. For example, the geo query service may allow developers to query one or more data types of a geographic data provider's underlying data layer (e.g., the stored data types underlying the geographic data provider's sophisticated model of the real world). In some embodiments, the geo query service may allow developers to query one or more types over a particular region and use the resulting information in determining how to style the application environment (e.g., the game world). The geo query service may allow a developer to query the map geometry, tailor the development of the game environment based on the map geometry, and adjust the content of the game environment to enable more interesting game play. In some embodiments, the geo query service may provide data regarding map geometry (e.g., the polygons that make up a map), metadata, and the like which may allow the developer to make relevant decisions on styling the game environment for an area as well as the type of content to spawn in an area. In some embodiments, the geo query service may provide a cloud based service for analyzing map facts for use in a developer's game design decisions. For example, based on information provided by the geo query service, the developer may decide that a real-world area that has a number of parks could be styled as a tropical region in the game environment, or that a region with few buildings may be an area to build up interesting in-game features and environment.

In some embodiments, the API may provide a location-based fraud detection service to application developers for use in a location aware application, such as a location-based gaming application, such as to discourage players cheating in a game. For example, the location-based fraud detection service may aggregate a plurality of signals and provide analysis of the aggregated signals to determine if users are violating terms of service, such as by spoofing their location. In some embodiments, the location-based fraud detection service may analyze Wi-Fi scan data dumps to perform user location authentication and identify potential fraudulent user locations. In some embodiments, the location-based fraud detection service could analyze a plurality of sensor data signals regarding user movement to identify potential user fraud. For example, knowing generally how long it takes a user to move from one location to another location, the location-based fraud detection service could detect anomalies in the user movement patterns that may indicate fraud (e.g., could a user realistically move in that manner).

In some embodiments, the API may provide geographic information allowing a developer to link valuable game resources to real world locations, for example, to encourage player interaction with the real world environment. The API may allow a developer to discover and understand the types of locations (e.g., businesses) that are within reachable distances of the users. For example, the API may provide developers with geographic information including the properties of businesses in a given area (e.g., type of business, number of businesses of a particular type, operating hours, etc.) to allow the developers to appropriately map game resources to real world locations (e.g., map a rare resource to a rare type of business, allow some resources to move and some to remain in static locations, etc.).

In some embodiments, the API may also provide geographic information allowing a developer to understand how an application (e.g., a location-based game) is driving foot traffic and how much traffic it is driving to allow for appropriate changes to game content. For example, the API may provide information regarding events and where crowds may develop to allow a developer to more quickly generate resources where there may be a large number of users. In some embodiments, the API may provide information on user patterns (e.g., based on cloud analytics) to understand user behavior (e.g., player behavior downtown versus player behavior in the suburbs, play at night versus play during the day, play in good weather versus play in bad weather, comparison of play in differing geographic regions, etc.) and allow for game adjustments based on the patterns.

In some embodiments, the API may provide information, including an understanding of how an application drives foot traffic, allowing a developer to adapt an application to encourage connecting users with the businesses and the world around them. For example, some business may be eager to connect with users (e.g., become locations where resources are spawned), while other businesses (e.g., medical facilities) will not be eager to have crowds of users near entrances to their facilities. In some embodiments, the API may provide information regarding a centralized catalog of businesses to allow the developer to make such appropriate decisions regarding game design, such as by pairing business information with player behavior and enabling a developer to evolve game play in a way that is responds to the player's environment and relevant to both the players and the businesses around them.

In some embodiments, the API may allow developers to use map properties to design game play. The API may provide developers to understand the real world environment around their users in detail to use in designing or adjusting game play. For example, the API may provide information to developers regarding where game play is incentivizing users to go and allow for making adjustments accordingly. The API may provide developers with information regarding the properties of the regions the players are in and use the environment properties (e.g., urban environment versus rural environment) to effectively design or adjust game play. In some embodiments, the API may provide detail to allow developers to influence the game play, such as how geography should influence game content or activities, how weather should influence user actions, how travel modes should influence game play, and the like.

In some embodiments, the API may allow developers to incorporate real time information into an application (e.g., location-based game), for instance, to make the application more dynamic. For example, changes in the time of day may adjust the look and feel of the game and incentivize different types of user activities or modify placement of resources (e.g., not spawning resources at a business when it is closed). The API may provide information about real-time events allowing developers to provide for spawning special and/or temporary resources during events, such as to encourage more social interactions and integration.

FIG. 1 depicts an overview of an example system 100 for implementing a geographic data service as part of a software application using a geo/games API according to example embodiments of the present disclosure. The system 100 can include a user device 112 that can receive geographic data from a geographic data provider 114 via a communication network 116. The user device 112 can be, for instance, a smartphone, tablet, wearable device, laptop, desktop, mobile device, device capable of being carried by a user while in operation, display with one or more processors, vehicle system, or other user device 112.

A software application 120 can be implemented on the user device 112. The software application can be, for instance, a developer application, a browser, a game application, an application used to assist with delivery, a social media application, or other software application that may need to provide geographic information to a user. The software application 120 can be stored locally on the user device 112 or can be, for instance, a web application accessed via a browser implemented on the user device 112. In some embodiments, the software application 120 can be developed by a third party entity that is independent of and/or not affiliated with an entity associated the geographic data provider 114.

The software application 120 can invoke a geo/games API 130 to access and provide geographic data from the geographic data provider 114 via the communication network 116 so that a geographic data service can be embedded in the software application 120. Example aspects of the present disclosure are discussed with accessing data from a remote geographic data provider 114 for purposes of illustration and discussion. Those of ordinary skill in the art, using the disclosures provided herein, will understand that the API 130 can access data from other sources, such as local sources or applications located on the user device 112.

The geographic data service can present geographic information (e.g., map geometry, map metadata, location properties, location datasets, real time signals, location intelligence) to a user. The user may be a third party developer who may use the geographic information in providing a location aware application such as a location-based game. For example, the geographic information may provide the developer with intelligent and relevant suggestions of where to spawn objects or activities within a game environment that align with real world locations that are safe, appropriate, and ideal locations for game play.

Referring back to FIG. 1, the API 130 can be configured to interface with a geo/games engine 140 implemented by the geographic data provider 114. The geo/games engine 140 can be configured to, for instance, access mapping data and signals, create and/or update location datasets based on various events or feedback, generate location intelligence signals, and respond to requests for geographic data from the API 130. In some embodiments, the geographic data provider 114 can include one or more servers, such as web servers. The one or more servers can include one or more processors and one or more memory devices. The one or more memory devices can store computer-readable instruction to implement, for instance, the geo/games engine 140. In some embodiments, the geo/games engine 140 can access data associated, for instance, with a geographic information system 115. The geographic information system 115 can include data that indexed by geographic coordinates of its elements. The data associated with the geographic information system 115 can include, for instance, map data, route data, geographic imagery, data associated with various waypoints (e.g., business listing names, addresses, geographic coordinates, etc.), real-time signals (e.g., usage or traffic patterns), and other data.

The application 120 can implement a geographic information service by interacting with the geographic data provider 114 via the API 130 over the network 116. The network 116 can be any type of communications network, such as a local area network (e.g. intranet), wide area network (e.g. Internet), cellular network, or some combination thereof. The network 116 can also include a direct connection. In general, communication can be carried via network 116 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 2:
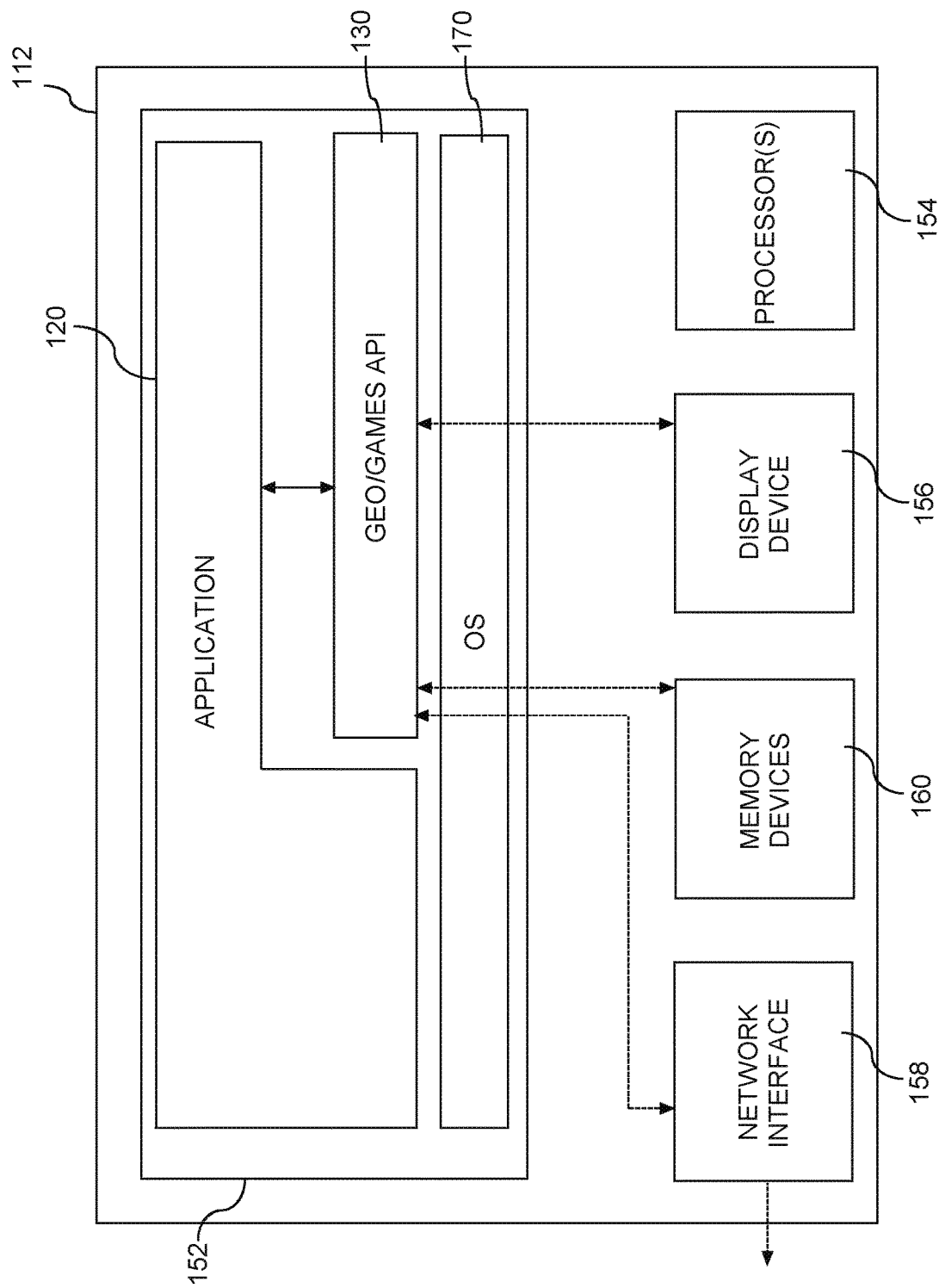
FIG. 2 depicts a block diagram of an example user device implementing a software application according to example embodiments of the present disclosure.

FIG. 2 depicts an example user device 112 configured to implement a geo/games API 130 according to example embodiments of the present disclosure. As shown, the user device 112 includes an instruction memory 152, one or more processors 54 configured to execute instructions stored in the memory 152, a display device 156, a network interface 158 that supports network communications, and a storage memory 160. For clarity, the instruction memory 152 and the storage memory 160 are illustrated separately. It will be understood, however, that the components 152 and 160 also can be regions within the same memory module. More generally, the user device 112 can include one or several additional processors, memory devices, network interfaces, which may be provided separately or on a same chip or board. Further, the components 152 and 160 may include persistent memory (e.g., flash memory), volatile memory (e.g., RAM), or both, or other suitable memory.

The instruction memory 52 can store sets of instructions of an operating system (OS) 170, a geo/games API 130, and a software application 120. The OS 170 can be a mobile OS developed specifically for mobile devices. As such, the OS 170 can include functions that allow the software application to access data such as wireless network parameters (e.g., identity of the wireless network, quality of service), as well as invoke such services as telephony, location determination (e.g., via global positioning service (GPS) or WLAN), wireless network data call origination, etc. In other implementations, the OS 170 is a general-purpose operating system that operates on both mobile and stationary devices, such as smartphones and desktop computers, for example. In some example implementations, the OS includes or based upon an Android® mobile operating system developed by Google Inc. or similar operating system to implement an Android operating platform. However, other suitable operating systems can be used without deviating from the scope of the present disclosure.

The software application 120 can be, for example, a developer application, a navigation application, gaming application, an application to assist with delivery, a social media application, etc. Further, the software application 120 can be a web browser application that invokes the geo/games API 130 to provide geographic information within an allocated portion of a browser window. In general, the geo/games API 130 can be made available to any suitable software application that executes on the user device 120. Also, multiple different software applications may invoke the geo/games API 130.

As discussed above, the software application 120 can invoke the geo/games API 130 to embed a geographic information service in the software application 120. For instance, in one example, a software application 120 can provide one or more queries to the geo/games API 130. The geo/games API 130 can request geographic data from a remote geographic data provider to determine location information (e.g., location scores, location suggestions, traffic patterns, usage patterns, map geometry, map metadata, real-time signals, etc.) based on the one or more queries. The geo/games API 130 can include sets of instructions to control the presentation of geographic information to the user as part of the geographic information service.

In some embodiments, the positioning system can include one or more devices or circuitry for determining the position of a device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position.

The API 130 can be implemented as one or several functions, a data structure, etc. Further, the API 130 may include compiled code that executes directly on the processor(s) 154 or, alternatively, instructions in any other form such as a scripting language interpreted at runtime by the application 120. The API 130 in one example implementation includes well-documented prototypes of several functions which a developer can include in the code of the software application 120, as well as instructions that implement these functions. In some embodiments, the API 130 can be provided to the developer as a static library.

FIG. 3 depicts a block diagram of an example output data structure 300 for candidate location data according to example embodiments of the present disclosure. As described herein, candidate location data can be generated by a playability service for use in applications, such as location-based gaming applications, based on map points of interest, and/or generated randomly. In some embodiments, the playability service can generate an output candidate location dataset, such as candidate locations dataset 300. In some embodiments, a candidate location dataset 300 can include candidate locations for one or more regions 302.

A candidate location dataset 300 can include a plurality of fields which describe the candidate locations. For example, in some embodiments, the candidate location dataset 300 can include a latitude 304 and a longitude 306 of the candidate location, a place identifier 308, a score 310, and a location type 312. In some embodiments, the latitude 304 and longitude 306 of the candidate location can represent an access point for a point of interest along a road and/or can represent the point of interest snapped to a nearby road (e.g., the closest location for the point of interest along a nearby road).

In some embodiments, the place identifier 308 can be used to obtain additional information about the candidate location, for example, information associated with a point of interest at the candidate location. In some embodiments, the score 310 can represent the quality or desirability of the candidate location, for example, for use in placing in-game objects, and can be used to generate a rank order for the candidate location data. In some embodiments, the type 312 can identify a point of interest category (e.g., park, attraction, store, transit station, etc.).

A playability service can provide access to the candidate location dataset 300 to a developer for use in generating locations in an application such as, for example, to provide for placement of in-game objects in a location-based gaming application. For instance, in some embodiments, a playability service can provide for a developer to query or export all or part of the candidate location dataset 300.

Figure 4:
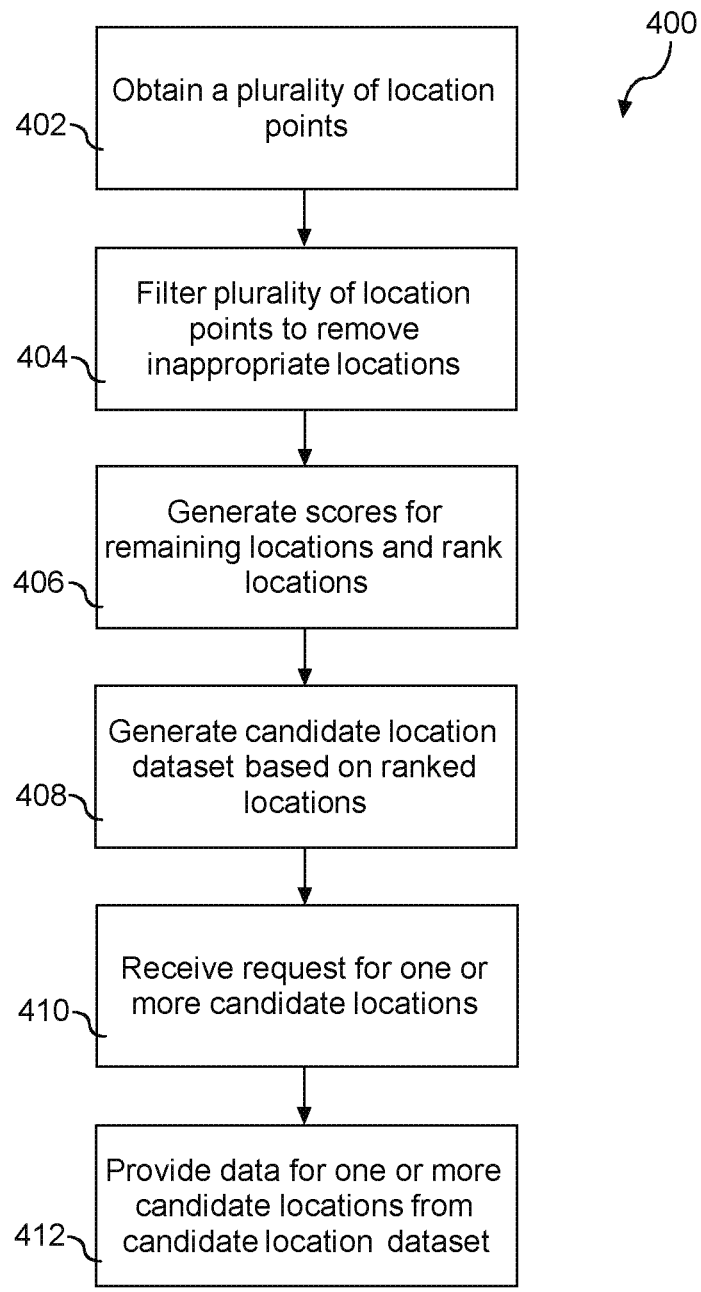
FIG. 4 depicts a flowchart diagram of example operations for determining candidate game locations for a playability service according to example embodiments of the present disclosure.

FIG. 4 depicts a flowchart diagram of example operations for determining candidate game locations for a playability service according to example embodiments of the present disclosure.

At 402, a computing system, such as geo data provider 114, for example, can obtain a plurality of location points associated with a region of a map. In some implementations, the location points can be associated with points of interest in a map region and/or can be location points associated with roads, parks, gardens, woods, and/or the like in a map region.

At 404, the computing system can filter the obtained location points to exclude locations that may be inappropriate for use in an application (e.g., location points that would provide poor playability in a location-based gaming application, such as location points that are restricted, unsafe, and/or the like). For example, in some embodiments, obtained location points (e.g., points of interest) may be filtered using a blacklist comprising points of interest associated with sensitive and/or age-restricted categories. In some embodiments, obtained location points may comprise a location whitelist (e.g., roads that have pedestrian access and no pedestrian restrictions, parks, gardens, woods, and/or the like) which can be filtered using a location blacklist (e.g., inappropriate geographic features, sensitive locations, points of interest associated with sensitive and/or age-restricted categories, and/or the like).

At 406, the computing system can generate scores for the location points. In some embodiments, the score for a candidate location point can represent a suitability measure of a location point for use in generating location-based application content. For example, in some embodiments, the location points can be scored based in part on one or more parameters and/or measures associated with a point of interest. For instance, points of interest may be scored based on parameters such as popularity, prominence, landmarkiness, basemap rank, approachability, point of interest category, operating hours, and/or the like.

For example, in some embodiments, a location point score can be based at least in part on a number of visits to the location point. In some embodiments, a location point score can be based at least in part on a number of photos captured of the location point. In some embodiments, a location point score can be based at least in part on one or more signals that are used to determine and/or prioritize location points for display in a geographic information system (e.g., for display on a map, etc.).

Additionally, in some embodiments, candidate location ranks may be adjusted based on developer feedback. For example, a candidate location rank can be adjusted by a bonus amount or a penalty amount based on developer feedback on the category of the point of interest. Additionally or alternatively, in some embodiments, such as where candidate location points are generated randomly for a region, the candidate locations can be ranked based at least in part on randomly generated scores.

At 408, the computing system can generate a ranked candidate location dataset based on the scored filtered location points (e.g., candidate location points).

At 410, the computing system can receive a request for one or more candidate location points. For example, in some embodiments, the computing system can receive a request for one or more candidate locations from a developer (e.g., via an API call) for use in generating location-based application content, such as for placement of in-game objects in a location-based gaming application, for example.

At 412, the computing system can provide, in response to the request, data associated with one or more candidate location points included in the candidate location dataset (e.g., via an API call) for use in an application, such as a location-based gaming application. In some embodiments, the computing system can provide data associated with one or more candidate location points based on one or more parameters and/or constraints provided in the request.

Figure 5:
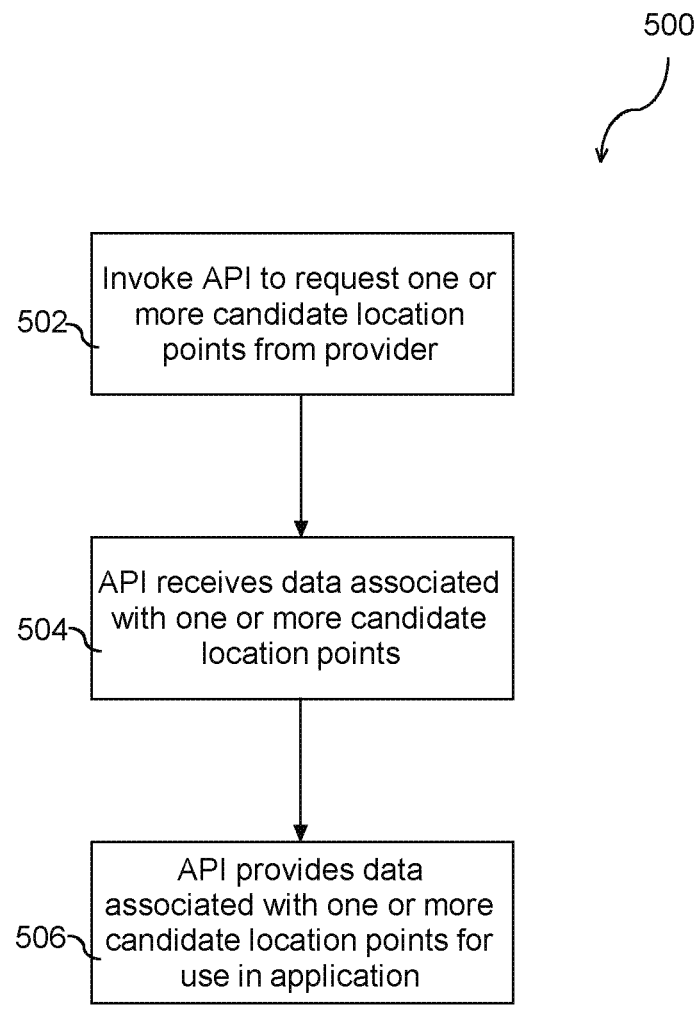
FIG. 5 depicts a flowchart diagram of example operations for determining candidate game locations at a user device according to example embodiments of the present disclosure.

FIG. 5 depicts a flowchart diagram of example operations 500 for determining game locations to be used by an application at a user device according to example embodiments of the present disclosure.

At 502, a computing device, such as user device 112, for example, can invoke an API installed on the computing device to request one or more of a candidate location points. For example, a software application, such as a location-based gaming application, installed on the computing device can invoke an API installed on the computing device. The API can generate a call to a data provider, such as a playability service, for example, to request one or more candidate location points for use in generating location-based application content.

At 504, the computing device can receive, via the API, data associated with one or more candidate location points in response to the request.

At 506, the computing device can provide, via the API, the data associated with one or more candidate location points for use in the software application that invoked the API. For example, the API can provide the data associated with one or more candidate location points received from the data provider to the calling software application such the software application can use the data associated with one or more candidate location points to generate location-based application content within the software application.

Figure 6:
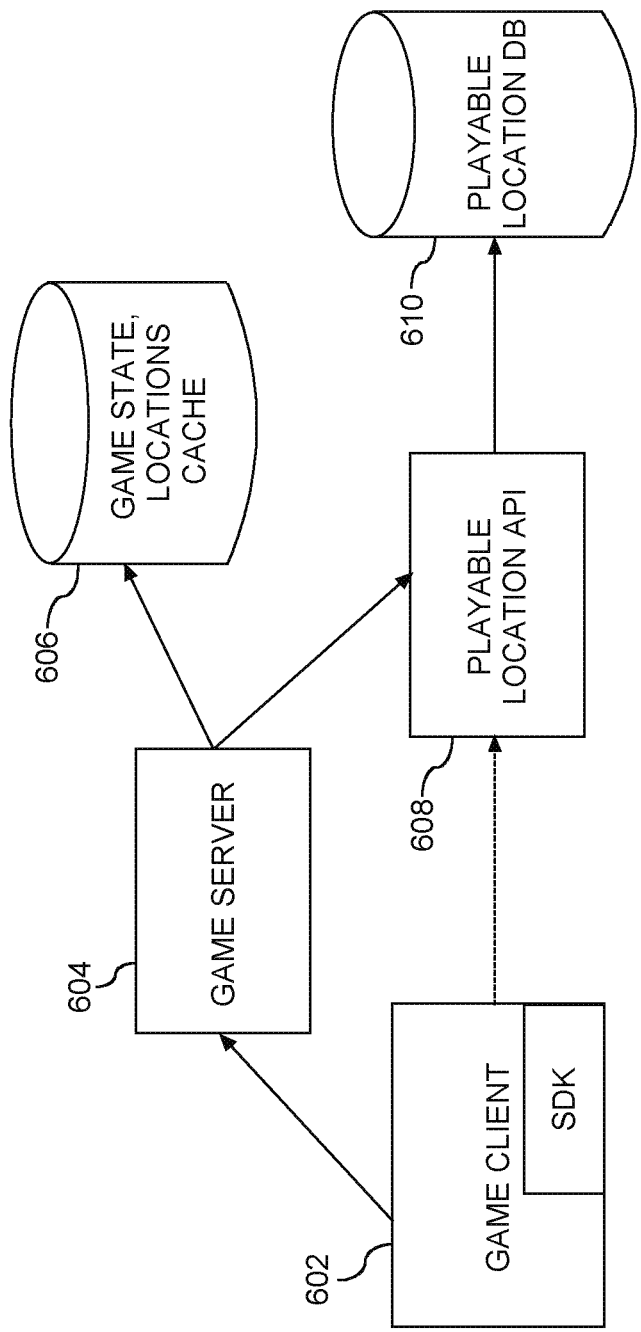
FIG. 6 depicts a block diagram of an example system for a playable locations service for a location-based application according to example embodiments of the present disclosure.

FIG. 6 depicts a block diagram of an example system 600 for determining candidate game locations in an application according to example embodiments of the present disclosure. The system 600 can include a game client 602 (e.g., installed on a user device, etc.), a game server 604 (e.g., maintained by the application developer, a game state/locations cache 606 (e.g., maintained by the application developer), a playable locations API 608 and a playable location database 610, both maintained by a data provider.

In some embodiments, a location-based gaming application, such as game client 602, may be associated with a game server, such as game server 604, which can augment playable location data with game-specific state data. In such embodiments, the game server can call the playable locations API 608 to request a list of playable locations in a region or request updated playable location data.

The playable locations API 608 can select playable locations from the playable locations database 610 based on criteria supplied with the request from the game server 604, as described herein. The playable locations API 608 can return the playable locations (and associated metadata) to the game server 604. The game server 604 can use the playable locations metadata to generate location-based game content for the game client 602.

In some embodiments, the game server 604 can store game state and playable location metadata to a game state/locations cache 606 and use the game state and playable location metadata to generate location-based game content for the game client 602. In some embodiments, the game server 604 can use playable location metadata (e.g., location identifiers) to call the playable locations API 608 to request refreshed location metadata for the specified playable locations. The playable locations API 608 can return the playable locations metadata for the specified playable locations to the game server 604.

Alternatively, in some embodiments, a game server 604 may not be included and the game client 602 may call the playable locations API 608 to request a list of playable locations in a region and/or request updated playable location data.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for determining candidate locations for a playability service, the method comprising:
    obtaining, by one or more computing devices, a plurality of location points;

filtering, by the one or more computing devices, the plurality of location points to obtain a plurality of candidate location points based at least in part on a suitability of each of the location points for use in generating in-game objects for use in one or more location-based games;

generating, by the one or more computing devices, a candidate location dataset based on the plurality of candidate location points;

after generating the candidate location dataset based on the plurality of candidate location points, receiving, by the one or more computing devices, a request for one or more of the plurality of candidate location points suitable for use in generating in-game objects for use in the one or more location-based games; and providing, by the one or more computing devices, data associated with one or more of the plurality of candidate location points in response to the request.

2. The computer-implemented method of claim 1, wherein the request is received via an application programming interface call.

3. The computer-implemented method of claim 2, wherein the application programming interface call is received from a API on a user device, the API being invoked by a software application also installed on the device, wherein upon receipt of the data associated with the one or more of the plurality of candidate location points, the API functions to provide the data to the software application for use in the software application.

4. The computer-implemented method of claim 1, wherein the candidate location dataset is generated based at least in part on a score associated with suitability for use in generating in-game objects for a location-based game for each of the plurality of the candidate location points.

5. The computer-implemented method of claim 4, wherein the score is based on a number of visits to the location point.

6. The computer-implemented method of claim 4, wherein the score is based at least in part on a number of user generated photos captured of the location point.

7. The computer-implemented method of claim 4, wherein the score is based on a signal used to prioritize the location point for display in a geographic information system.

8. The computer-implemented method of claim 1, wherein the plurality of location points are filtered based at least in part on a blacklist.

9. The computer-implemented method of claim 1, wherein the candidate location dataset comprises, for each location point, geographic position data, a location identifier, and a score associated with suitability of the location point for use in generating in-game objects for a location-based game.

10. The computer-implemented method of claim 1, wherein the plurality of candidate location points are determined for providing in response to the request based at least in part on player location.

11. The computer-implemented method of claim 1, wherein the candidate locations are determined based at least in part on developer feedback.

12. The computer-implemented method of claim 11, wherein the developer feedback is indicative of application type.

13. The computer-implemented method of claim 1, wherein the candidate locations are playable locations determined based on a player's position.

14. One or more non-transitory computer-readable media that store instructions that, when executed by one or more processors of a computing system, cause the computing system to perform operations, the operations comprising:
obtaining a plurality of location points;
filtering the plurality of location points to obtain a plurality of candidate location points based at least in part on a suitability of each of the location points for use in generating in-game objects for use in one or more location-based games;
generating a candidate location dataset based on the plurality of candidate location points;
after generating the candidate location dataset based on the plurality of candidate location points, receiving a request for one or more of the plurality of candidate location points suitable for use in generating in-game objects for use in one or more location-based games; and
providing data associated with one or more of the plurality of candidate location points in response to the request.

15. The one or more non-transitory computer-readable media of claim 14, wherein the candidate location dataset is generated based at least in part on a score associated with suitability for use in generating in-game objects for a location-based game for each of the plurality of the candidate location points.

16. The one or more non-transitory computer-readable media of claim 15, wherein the score is based at least in part on one or more of:
a number of visits to the location point;
a number of user generated photos captured of the location point; and
a signal used to prioritize the location point for display in a geographic information system.

17. A computer-implemented method for obtaining candidate locations for use in a location-based game software application installed on a user device, the user device being configured to communicate with a remote data provider, the remote data provider being configured to obtain a plurality of location points, to filter the plurality of location points to obtain a plurality of candidate location points based at least in part on a suitability for generating in-game objects for use in one or more location-based games, and to generate a candidate location dataset based on the plurality of candidate location points, the method comprising:
invoking, by the software application, an API installed on the user device to request one or more of the plurality of candidate location points suitable for use generating in-game objects for use in one or more location-based games from the remote data provider;
receiving, by the API, data associated with one or more of the plurality of candidate location points suitable for use generating in-game objects for use in one or more location-based games from the remote data provider; and
providing, by the API, the data associated with one or more of the plurality of candidate location points for use in the location-based game software application.

18. The computer-implemented method of claim 17 wherein the candidate location dataset is generated based at least in part on a score associated with suitability for use in generating in-game objects for a location-based game for each of the plurality of the candidate location points.

19. The computer-implemented method of claim 17, wherein the candidate location dataset comprises, for each location point, geographic position data, a location identifier, and a score associated with suitability of the location point for use in generating in-game objects for a location-based game.

* * * * *